M. H. LUCAS.
VALVE ACTUATOR.
APPLICATION FILED MAY 29, 1917.
1,261,949.
Patented Apr. 9, 1918.
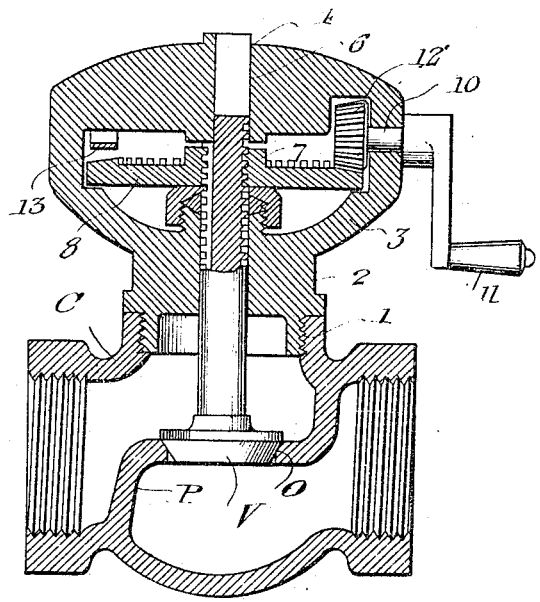
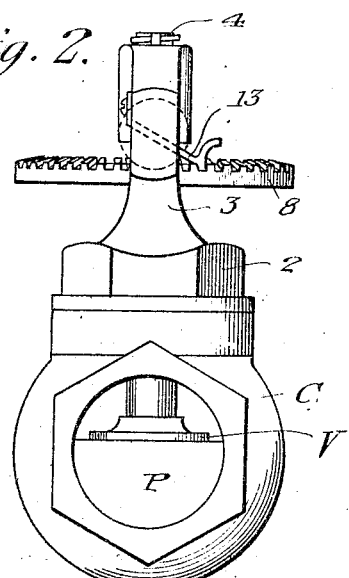
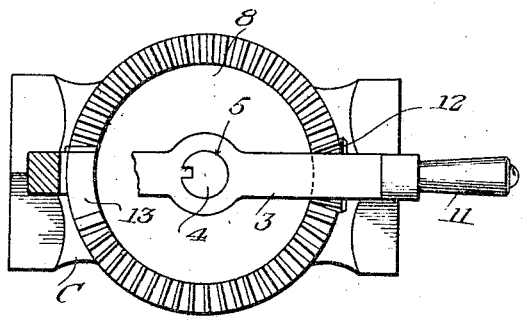
INVENTOR
M. H. Lucas.
BY Victor J. Evans
ATTORNEY
WITNESSES

UNITED STATES PATENT OFFICE.

MAHLON H. LUCAS, OF MOSHANNON, PENNSYLVANIA.

VALVE-ACTUATOR.

1,261,949.  Specification of Letters Patent.  Patented Apr. 9, 1918.

Application filed May 29, 1917. Serial No. 171,741.

*To all whom it may concern:*

Be it known that I, MAHLON H. LUCAS, a citizen of the United States, residing at Moshannon, in the county of Center and State of Pennsylvania, have invented new and useful Improvements in Valve-Actuators, of which the following is a specification.

This invention relates to water distribution, and more especially to the actuators for valves; and the object of the same is to produce a device for setting a throttle valve or other valve to regulate its opening to a very fine degree, and to hold it to any position in which it may be set.

The invention consists in the details hereinafter more fully described and claimed, and as shown in the drawings wherein:—

Figure 1 is a vertical sectional view through this valve and its actuating mechanism.

Fig. 2 is an end elevation thereof.

Fig. 3 is a plan view, partly in section and broken away to show the retaining spring.

The valve casing is lettered C, and as herewith illustrated it is of that type which contains the partition P having an opening O into which closes the valve V when pushed downward by means yet to be described. The inlet and outlet pipes are connected with the ends of the casing C in a manner not necessary to show. While I have illustrated a valve and its seat of this type, I do not wish to be limited in that respect.

Coming now to the details of the invention, there is screwed as at 1 into the upper side of the casing a guide comprising a standard 2 carrying an upright oval frame 3, and the valve stem 4 rises through the standard and frame and passes through the top of the same where the stem is made non-angular as seen at 5 in Fig. 3 where I have shown it as splined in an opening in the frame, although of course it could be made square or otherwise—the obvious purpose being to prevent the rotation of the valve stem as it is moved up and down by mechanism yet to be described. Within the frame the stem is provided with screw threads 6, and engaged with them is a nut 7 at the center of a large ring gear 8, which rotates within the frame above the upper end of the standard 2. Journaled through one end of the frame is a shaft 10 having a knob or handle 11 on its outer extremity, and carrying at its inner extremity a pinion 12 which engages with the teeth in said ring gear, so that when the handle is rotated the gear is turned, and the nut 7 in its hub engaging the threads 6 of the stem, causes the latter to rise or fall and therefore to open or close the valve V. At an appropriate point the frame carries a spring detent or pawl 13 which snaps into the teeth of the ring gear 8 to prevent the latter from moving accidentally after it has been set.

With a valve moved by this actuator, a very fine adjustment can be had. Turning the knob or handle 11 it rotates the small pinion 12, and the latter meshing with the teeth in the comparatively large ring gear 11 turns said gear only slightly. The threads in the nut 7 of the gear engaging those numbered 6 on the valve stem cause the latter to rise or fall very slowly, even though the handle 11 is turned quite rapidly; and therefore it will be clear that the valve may be adjusted with reference to its seat to the finest degree possible. While I prefer to use this actuator on a throttle valve, I do not wish to be limited thereto.

What is claimed as new is:—

In a valve actuator, the combination with the valve seat and valve, and a longitudinally movable valve-stem provided with threads; of a guide for said stem, a nut mounted on the guide and engaging said threads, a ring gear whereof the nut constitutes the hub, an upright frame carried by the guide and inclosing the ring gear, a shaft journaled in said frame and having operating means at its outer end, a pinion secured to the inner end of the shaft and meshing with the teeth of said gear, and a spring detent secured also in said frame with its tip resting on the teeth of the ring gear, substantially as described.

In testimony whereof I affix my signature.

MAHLON H. LUCAS.